(12) United States Patent
Lyu

(10) Patent No.: US 12,497,120 B2
(45) Date of Patent: Dec. 16, 2025

(54) HIDDEN-TYPE SHOCK ABSORBING BICYCLE FRAME

(71) Applicant: Astro Tech Co., Ltd., Changhua (TW)

(72) Inventor: Jia-Hua Lyu, Changhua (TW)

(73) Assignee: Astro Tech Co., Ltd., Changhua (TW)

( * ) Notice: Subject to any disclaimer, the term of this patent is extended or adjusted under 35 U.S.C. 154(b) by 648 days.

(21) Appl. No.: 18/070,720

(22) Filed: Nov. 29, 2022

(65) Prior Publication Data

US 2023/0227119 A1 Jul. 20, 2023

(30) Foreign Application Priority Data

Jan. 20, 2022 (TW) .................................. 111200796

(51) Int. Cl.
  *B62K 3/02* (2006.01)
  *B62J 1/08* (2006.01)
  *B62K 19/00* (2006.01)

(52) U.S. Cl.
  CPC ....... *B62K 3/02* (2013.01); *B62J 1/08* (2013.01); *B62K 19/00* (2013.01); *B62K 2201/00* (2013.01)

(58) Field of Classification Search
  CPC .......... B62K 19/30; B62K 19/00; B62K 3/06; B62K 3/02; B62K 25/30; B62K 25/286; B62K 2201/00; B62J 1/08; B62M 6/55
  See application file for complete search history.

(56) References Cited

U.S. PATENT DOCUMENTS

| 5,385,361 A | * | 1/1995 | De Bei | ................... B62K 25/28 280/283 |
| 10,071,786 B2 | | 9/2018 | Droux | |
| 2006/0237274 A1 | * | 10/2006 | Hsia | ...................... B62K 25/286 188/316 |
| 2016/0257371 A1 | * | 9/2016 | Droux | ................... B62K 25/286 |
| 2018/0273137 A1 | * | 9/2018 | Voss | ....................... B62K 25/28 |

FOREIGN PATENT DOCUMENTS

CN  106926957 A  * 7/2017  ............. B62K 25/04

OTHER PUBLICATIONS

CN-106926957-A Translation (Year: 2017).*

* cited by examiner

*Primary Examiner* — Christopher B Wehrly
(74) *Attorney, Agent, or Firm* — BACON & THOMAS, PLLC

(57) ABSTRACT

A hidden-type shock absorbing bicycle frame has a front vehicle frame, a transmission assembly, a rear vehicle frame, and a damper. The front vehicle frame has a seat tube having two assembly plates. The assembly plate has an upper pivot hole and a lower pivot hole. An assembly space is formed between the assembly plates. The transmission assembly is pivotally connected to the upper pivot holes and has two front arms located in the assembly space and two rear arms located at two sides of the seat tube and extending backwardly. The rear vehicle frame is pivotally connected with the rear arms and is pivotally connected with the seat tube. The damper hidden inside the assembly space has a top end pivotally connected with the front arms and a bottom end pivotally connected to the lower pivot holes.

12 Claims, 7 Drawing Sheets

HIDDEN-TYPE SHOCK ABSORBING BICYCLE FRAME

BACKGROUND OF THE INVENTION

1. Field of the Invention

The present invention relates to a bicycle, and more particularly to a hidden-type shock absorbing bicycle frame which hides a damper inside a sea tube of the bicycle frame.

2. Description of Related Art

A conventional shock absorbing bicycle frame has a front vehicle frame, a rear vehicle frame, and a damper. Generally, two ends of the damper are pivotally connected between the front vehicle frame and the rear vehicle frame, respectively. When a rear wheel of a bicycle is vibrated, the rear vehicle frame may absorb shocks by compressing the damper, so as to improve comfort of riding. Patent documents such as TW I680903, TW M544461, and US 20120228850 A1 have disclosed detailed structures of the conventional shock absorbing bicycle frame. According to those patent documents, the damper of the conventional shock absorbing bicycle frame is exposed in front of a seat tube of the conventional shock absorbing bicycle frame. The exposed structure not only impairs completeness and simplicity of appearances of bicycles, but also makes the damper prone to situations such as being affected by external forces and foreign objects or being interfered and damaged by dust, mud, and sand, which reduces operation stability and lifespan of the damper. Also, during extension, contraction, and swing of the damper, a rider's clothing or accessories may be clipped, hindering convenience and safety of riding.

SUMMARY OF THE INVENTION

The main objective of the present invention is to provide a hidden-type shock absorbing bicycle frame which hides a damper inside a seat tube of the bicycle frame for protecting the damper and improving completeness and simplicity of bicycle appearances, so as to overcome the aforementioned shortcomings of the exposed damper of the conventional shock absorbing bicycle frame.

The hidden-type shock absorbing bicycle frame comprises a front vehicle frame, a transmission assembly, a rear vehicle frame, and a damper. The front vehicle frame comprises a seat tube substantially extending uprightly and having a lower end, a seatpost installation hole, and a pair of assembly plates. The seatpost installation hole is formed on an upper section of the seat tube. Each one of the pair of assembly plates has an upper pivot hole and a lower pivot hole. An assembly space is formed between the pair of the assembly plates and is substantially enclosed. The transmission assembly is pivotally connected to the upper pivot holes of the pair of assembly plates of the seat tube and comprises a pair of front arms and a pair of rear arms. The pair of front arms are located in the assembly space. Each one of the pair of rear arms is located at a respective one of two sides of the seat tube and extends backwardly.

The rear vehicle frame comprises a pair of seat stays, a pair of chain stays, and a pair of dropouts. Each one of the pair of seat stays has a front end pivotally connected with a respective one of the pair of rear arms of the transmission assembly. Each one of the pair of chain stays has a front end pivotally connected with the lower end of the seat tube. Each one of the pair of dropouts is fixed to a rear end of a respective one of the pair of seat stays and a rear end of a respective one of the pair of chain stays. The damper is hidden inside the assembly space of the seat tube in a substantially upright configuration and has a top end and a bottom end. The top end of the damper is pivotally connected with the pair of front arms of the transmission assembly. The bottom end of the damper is pivotally connected to the lower pivot holes of the pair of assembly plates of the seat tube.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
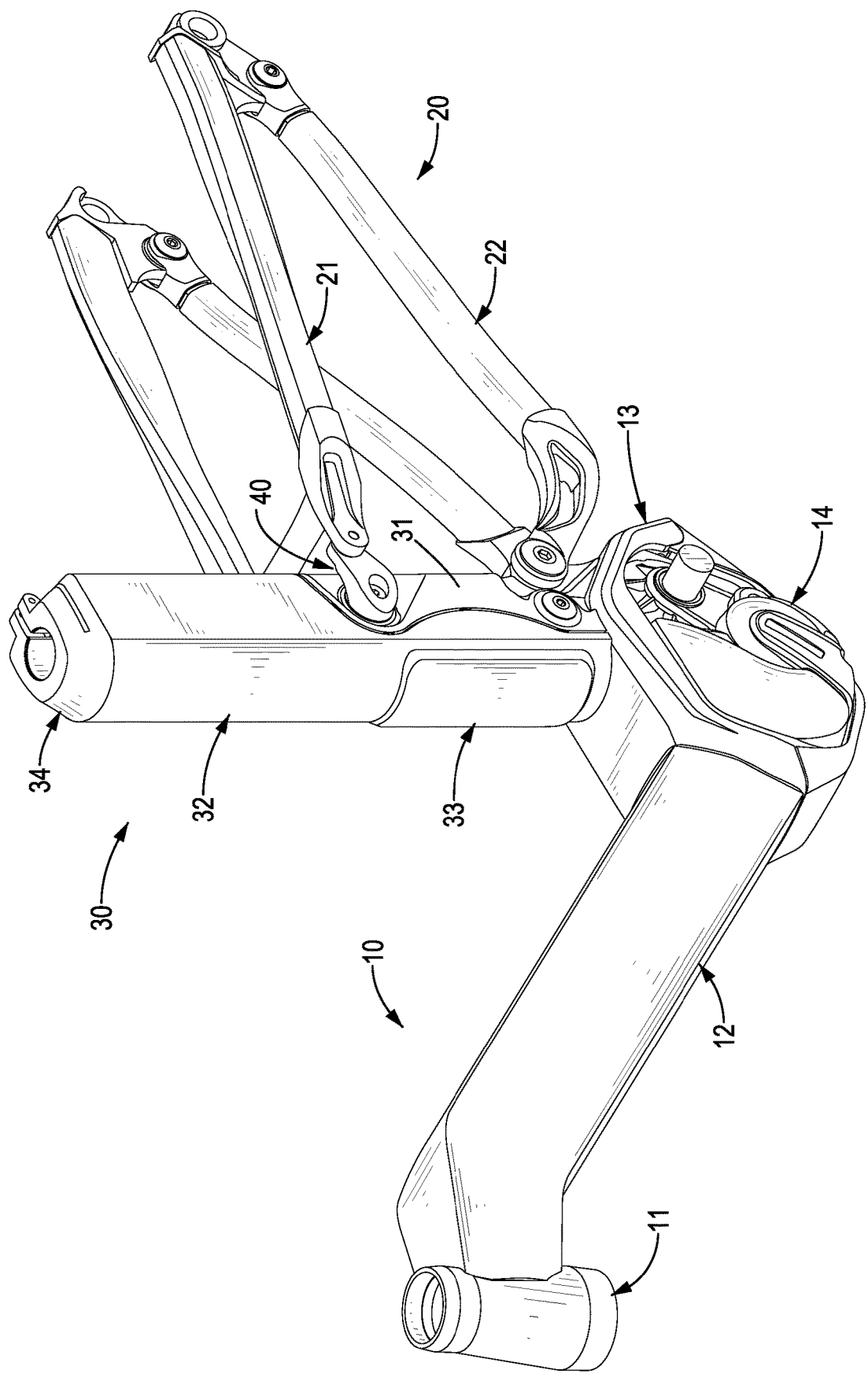
FIG. 1 is a perspective view of a hidden-type shock absorbing bicycle frame in accordance with the present invention.
Figure 2:
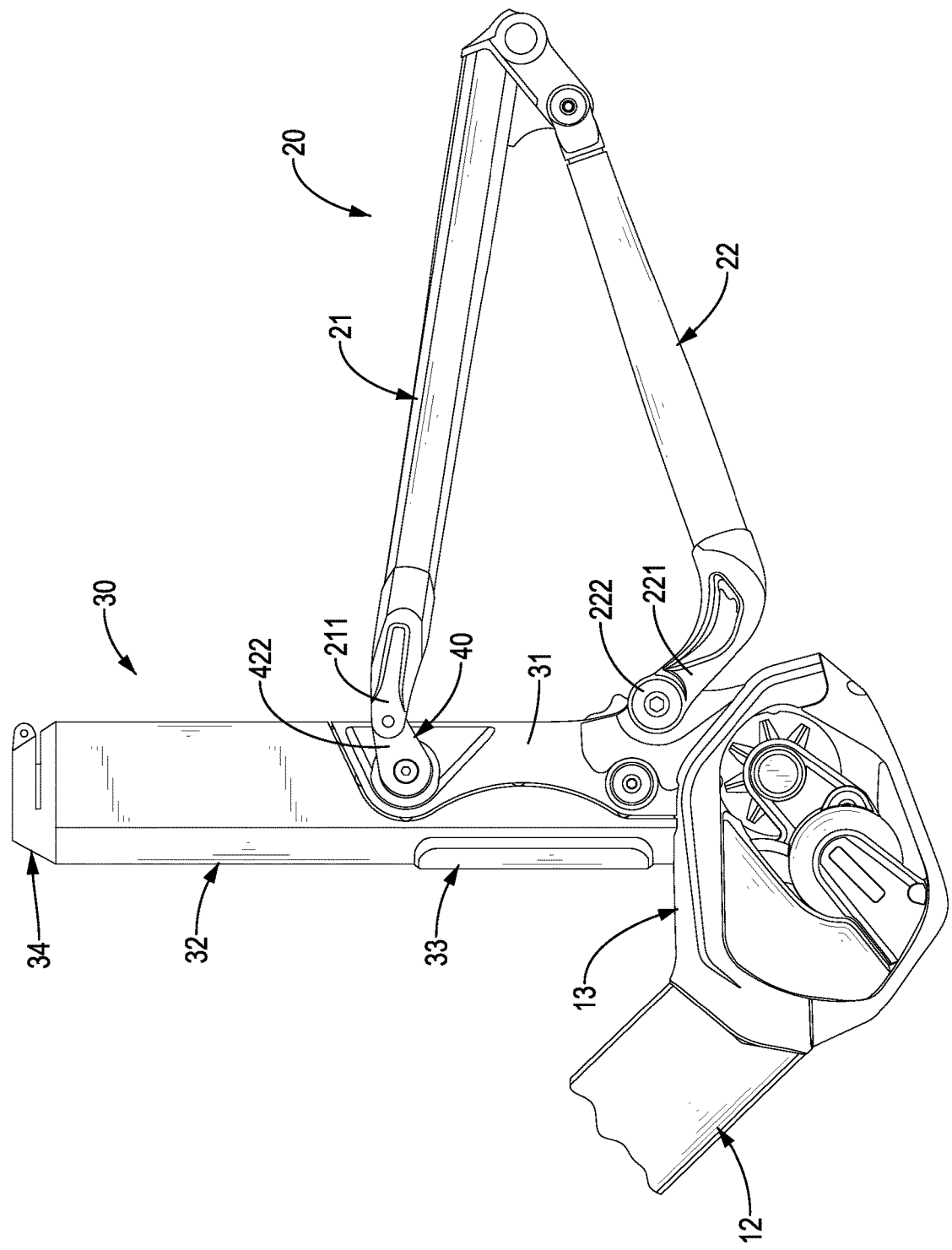
FIG. 2 is a side view of the hidden-type shock absorbing bicycle frame in FIG. 1.
Figure 3:
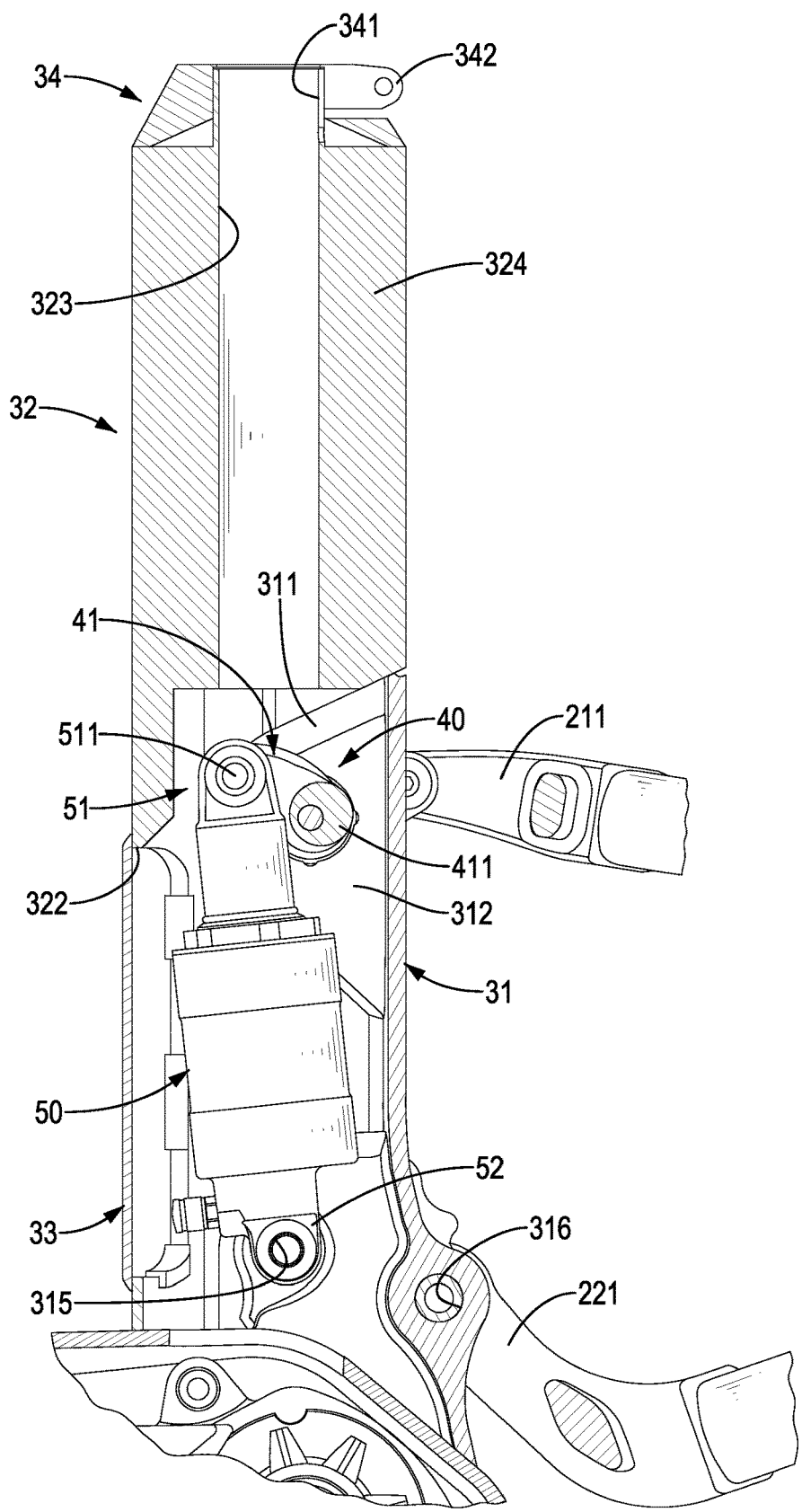
FIG. 3 is an enlarged side view in partial section of the hidden-type shock absorbing bicycle frame in FIG. 1.

With reference to FIGS. 1 to 3, a hidden-type shock absorbing bicycle frame in accordance with the present invention comprises a front vehicle frame 10, a rear vehicle frame 20, a seat tube 30 disposed on the front vehicle frame 10, a transmission assembly 40 pivotally connected between the seat tube 30 and the rear vehicle frame 20, and a damper 50 disposed inside the seat tube 30 and connected to the transmission assembly 40. The drawings depict a preferred embodiment of the present invention showing the hidden-type shock absorbing bicycle frame applied to an e-bike. The hidden-type shock absorbing bicycle frame in accordance with the present invention may also be applied to normal pedal-driven bicycles with rear dampers. The present invention is not restricted to specific power types of bicycles.

With reference to FIGS. 1 and 2, the front vehicle frame 10 includes a head tube 11 for mounting a fork, a down tube 12 which has a front end connected with the head tube 11 and extends backwardly and downwardly, a motor holder 13 connected to a rear end of the down tube 12, and the seat tube 30 substantially extending uprightly and having a lower end fixed to a top portion of the motor holder 13. The seat tube 30 is configured for installation of a saddle, and the motor holder 13 is configured to hold a driving motor 14.

Figure 4:
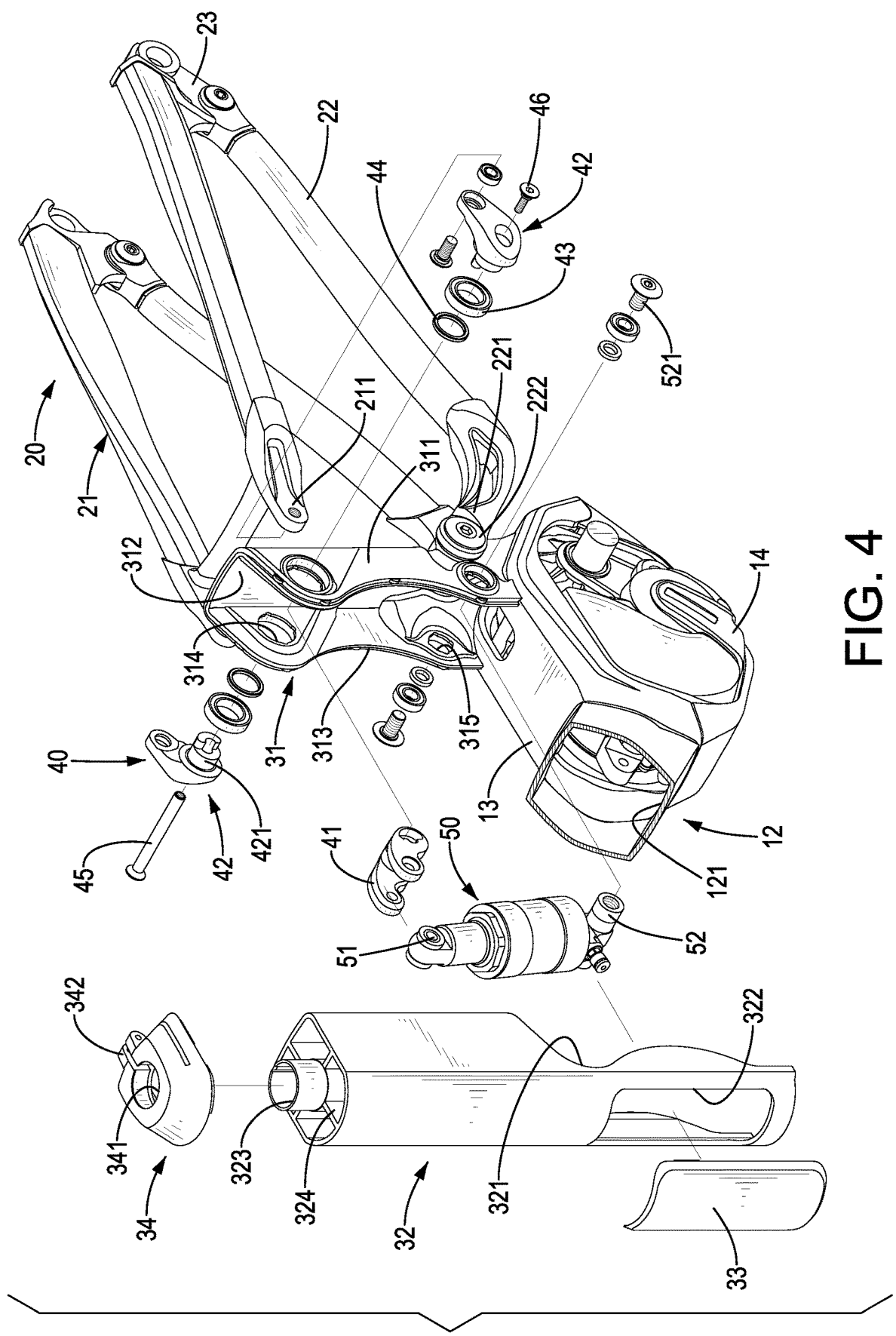
FIG. 4 is an exploded perspective view of the hidden-type shock absorbing bicycle frame in FIG. 1.
Figure 5:
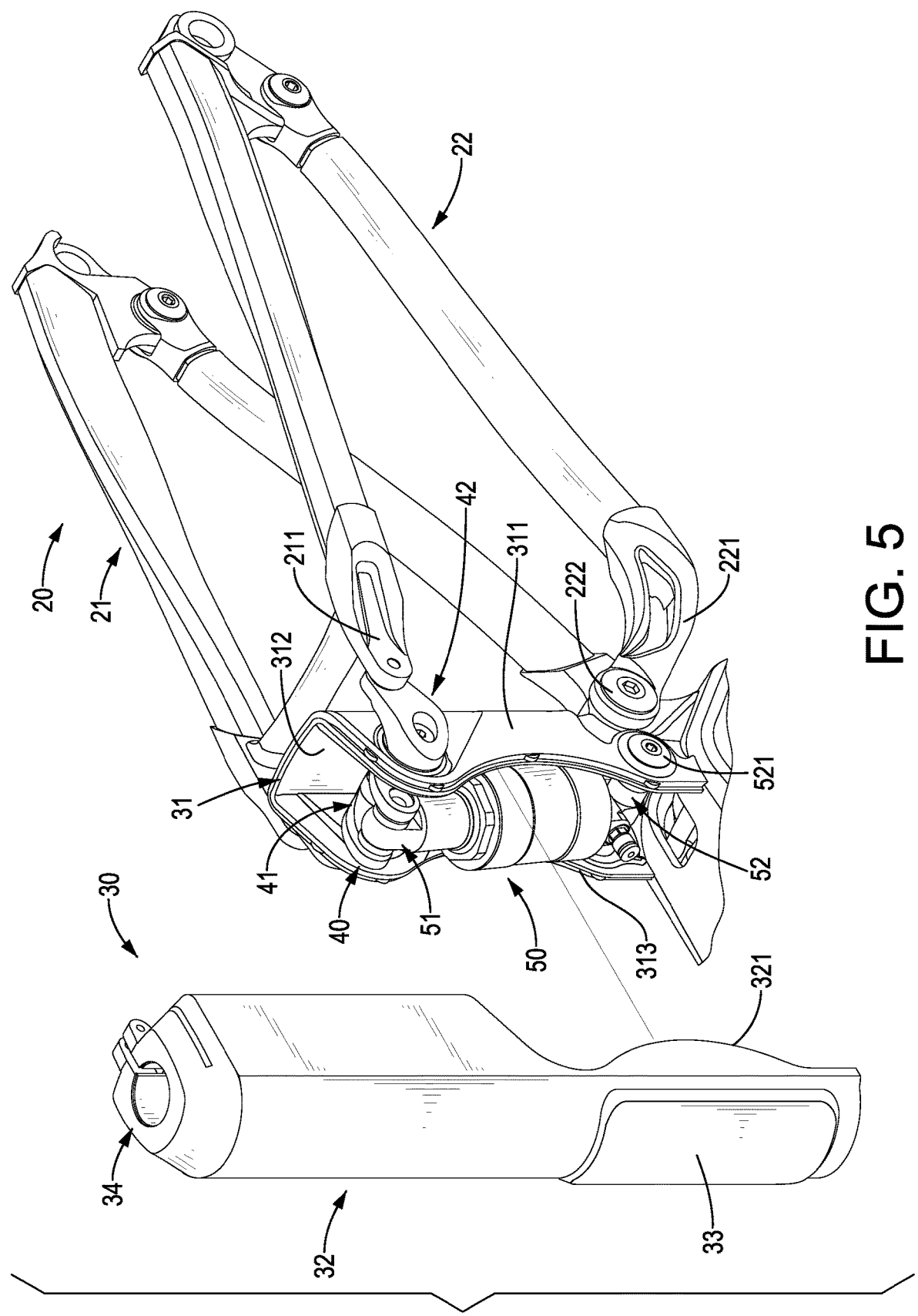
FIG. 5 is another exploded perspective view of the hidden-type shock absorbing bicycle frame in FIG. 1.

With reference to FIGS. 1, 4, and 5, the rear vehicle frame 20 comprises a pair of seat stays 21, a pair of chain stays 22, and a pair of dropouts 23 which are connected between the pair of seat stays 21 and the pair of chain stays 22. Each one of the pair of seat stays 21 has a front end serving as a connecting end 211 behind the one of two sides of the seat tube 30. The connecting ends 211 of the pair of the seat stays 21 have a pair of pivot holes mutually aligned for being pivotally connected to the transmission assembly 40. Each one of the pair of chain stays 22 has a front end serving as a connecting end 221 extending above the motor holder 13 and located on one of the two sides of the lower end of the seat tube 30. The connecting ends 221 of the pair of the chain stays 22 have a pair of pivot holes mutually aligned, and the connecting ends 221 of the pair of chain stays 22 are pivotally connected with the lower end of the seat tube 30 via a first pivot assembly 222 passing through the pair of pivot holes of the connecting ends 221 of the pair of chain stays 22. Through pivotal connecting structures of the connecting ends 211 of the pair of seat stays 21 and the connecting ends 221 of the pair of chain stays 22, the rear vehicle frame 20 is configured to swing up and down with respect to the front vehicle frame 10.

With reference to FIGS. 3, 4, and 5, the seat tube 30 comprises an assembly base 31 substantially extending uprightly and connected with the motor holder 13, a post tube 32 substantially extending uprightly and fixed with the assembly base 31, a cover 33 detachably mounted on the post tube 32, and a locking socket 34 connected to a top end of the post tube 32.

The assembly base 31 is a frame structure and has a pair of assembly plates 311 that are disposed at a spaced interval. An assembly space 312 is formed between the pair of the assembly plates 311. With reference to FIG. 4, the assembly base 31 has a back plate one-piece connected with back sides of the pair of assembly plates 311, so the assembly base 31 forms a U-shaped frame structure having an opening at a front side of the assembly base 31. Furthermore, front edges and a top edge of the assembly base 31 constitute a connecting edge 313 for connection with the post tube 32. In other embodiments, the assembly base 31 may have the opening at a rear side of the assembly base 31, or the assembly base 31 only has the pair of assembly plates 311 without the back plate. For assembling the transmission assembly 40 and the damper 50, each one of the pair of assembly plates 311 has an upper pivot hole 314, a lower pivot hole 315, and a rear pivot hole 316 behind the lower pivot hole 315. The rear pivot holes 316 of the pair of the assembly plates 311 are used for pivotally connecting the connecting ends 221 of the pair of chain stays 22, respectively.

A lower section of the post tube 32 is recessed and forms a connecting edge 321 that matches with the connecting edge 313 of the assembly base 31, so the post tube 32 and the assembly base 31 are configured to match each other and fixed together to form the substantially uprightly extending seat tube 31. The post tube 32 has an assembly hole 322 disposed through a front side of the lower section of the post tube 32. The assembly hole 322 communicates with the assembly space 312, facilitating installation and detachment of the transmission assembly 40 and the damper 50.

The cover 33 is configured to shield the assembly hole 322 by being detachably mounted thereto. An axial position of an upper section of the post tube 323 forms a seatpost installation hole 323 for installing a seatpost of a bicycle. The post tube 32 has multiple ribs 324 disposed at spaced intervals and connected with the seatpost installation hole 323 to support the seatpost installation hole 323, so as to reduce material and weight of the post tube 32.

With reference to FIG. 2, in the preferred embodiment of the present invention, the post tube 32 and the assembly base 31 are connected by welding the connecting edges 321, 313 of the assembly base 31 and the post tube 32. In other embodiments, the assembly base 31 and the post tube 32 may be a one-piece structure made by casting, extruding, molding, etc., the present invention is not limited to the above.

The locking socket 34 is connected to a top end of the post tube 32 and has a tubular hole 341 aligned with the seatpost installation hole 323 and a clamping part 342 configured to narrow the tubular hole 341.

With reference to FIGS. 1, 4, 6, and 7, the transmission assembly 40 comprises an arm base 41, a pair of side arm components 42 mounted on two sides of the arm base 41, a pair of bearings 43 mounted between the pair of the side arm components 42 and the arm base 41, a pair of flexible spacers 44, and an axle 45 assembling the aforementioned components. The arm base 41 has an axle portion 411 disposed transversely and a pair of front arms 412 extending from two ends of the axle portion 411, respectively. The pair of the front arms 412 has a pair of pivot holes 4121 on front ends of the pair of front arms 412. The axle portion 411 has an axle hole 413 disposed transversely therethrough for the axle 45 to pass through.

Figure 6:
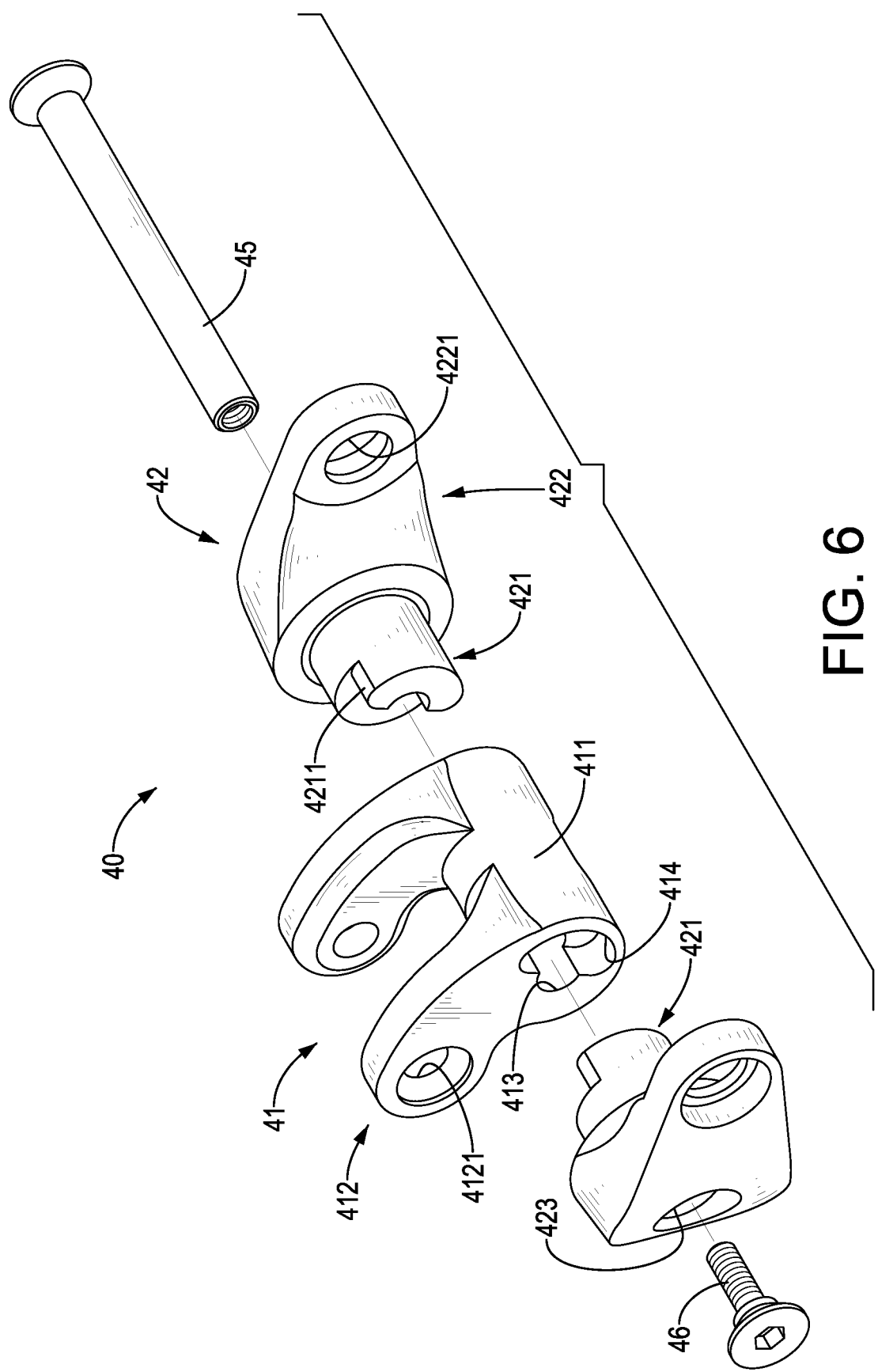
FIG. 6 is an exploded perspective view of a transmission assembly of the hidden-type shock absorbing bicycle frame in FIG. 1.
Figure 7:
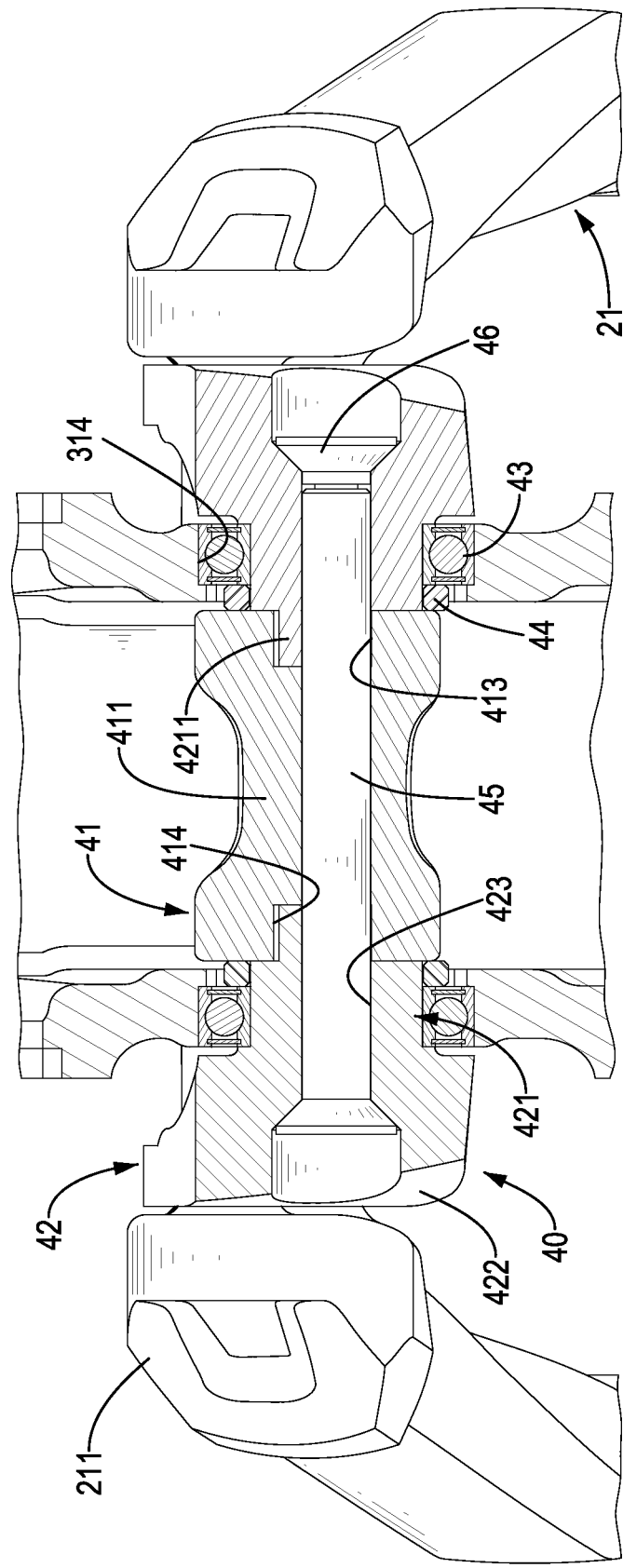
FIG. 7 is an enlarged side view in partial section of the transmission assembly of the hidden-type shock absorbing bicycle frame in FIG. 6.

The arm base 41 has a pair of engaging grooves 414 recessed from the two ends of the axle portion 41 and being non-circular. The pair of engaging grooves 414 may be polygonal such as quadrilateral and hexagonal, plum-blossom-shaped, oval, semicircular, etc., the present invention is not limited to the above. With reference to FIG. 6, the pair of engaging grooves 414 are semicircular.

Each one of the pair of side arm components 42 has an engaging head 421 engaged with a respective one of the pair of engaging grooves 414 and a rear arm 422 extending backwardly. The engaging head 421 has an engaging block 4211 and an axle hole 423. A shape of the engaging block 4211 matches the corresponding engaging groove 414. The axle hole 423 is disposed through the side arm component 42 for the axle 45 to pass through. The rear arm 42 has a pivot hole 4221 disposed on a rear end thereof For installing the transmission assembly 40, the arm base 41 is firstly put into the assembly space 312 of the assembly base 31 via the assembly hole 322, and the pair of bearings 43 and the pair of flexible spacers 44 are respectively sheathed on the engaging heads 421 of the pair of side arm components 42. Then the engaging heads 421 of the pair of side arm components 42 are inserted into and engaged with the pair of engaging grooves 414 of the arm base 41 through the upper pivot holes 314 of the assembly base 31. Eventually, the axle 45 passes through the axle holes 423, 413 of the pair of side arm components 42 and the arm base 41, and is screwed with a bolt 46. Thereby, with reference to FIGS. 4 and 7, the transmission assembly 40 is swingably mounted with the assembly base 31 of the seat tube 30. Each one of the pair of bearings 43 is disposed between the engaging head 421 of the corresponding side arm component 42 and the corresponding upper pivot hole 314. Each one of the pair of flexible spacers 44 is clamped between the corresponding bearing 43 and the axle portion 411 of the arm base 41.

With reference to FIGS. 3 to 5, the damper 50 is disposed inside the assembly space 312 of the seat tube 30 in a substantially upright configuration. Each one of a top end and a bottom end of the damper 50 is formed as a pivot head 51. The pivot head 51 at the top end of the damper 50 is disposed between the pivot holes 4121 of the pair of front arms 412 of the transmission assembly 40 with a second pivot assembly 511 passing through for pivotally connecting the pivot head 51 at the top end of the damper 50 with the pair of front aims 412 of the transmission assembly 40.

The pivot head 51 at the bottom end of the damper 50 is disposed between the lower pivot holes 315 of the assembly base 31. By a third pivot assembly 521 passing through the pivot head 51 and the lower pivot holes 315, the pivot head 51 at the bottom end of the damper 50 is pivotally connected to the assembly base 31, so when the transmission assembly 40 is affected by the rear vehicle frame 20 and thereby swings, the transmission assembly 40 makes the damper 50 compressed or extended, so as to provide efficacy of supporting, shock absorbing, and restoring during a damping process.

The present invention utilizes the components such as the seat tube 30 which has the assembly base 312, the rear vehicle frame 20, the transmission assembly 40, the damper 50 and so on to constitute the hidden-type shock absorbing bicycle frame as shown in FIGS. 1 to 3.

Fixing methods for the components mentioned above can be welding, mechanical mounting, or one-piece forming, the present invention is not limited thereto.

With reference to FIGS. 1, 3, and 5, the seat tube 30 with the assembly space 312 inside can hide the damper 50 inside the seat tube 30 with the transmission assembly 40 being an assembled structure. Besides maintaining completeness and simplicity of the appearances of the bicycles and improving style of the bicycles, the damper 50 can be prevented from being hit or rubbed by external forces and foreign objects and being interfered and damaged by dust, mud, and sand because the damper 50 is hidden inside. Therefore, operational stability and lifespan of the shock absorbing bicycle frame is improved and prolonged.

The transmission assembly 40 being an assembled structure provides convenience in installing the transmission assembly 40 to the assembly base 31 and enables the damper 50 inside the seat tube 30 to be connected and cooperate with the rear vehicle frame 20 behind the seat tube 30.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A hidden-type shock absorbing bicycle frame comprising:
   a front vehicle frame comprising
      a seat tube substantially extending uprightly and having
         a lower end;
         a seatpost installation hole formed on an upper section of the seat tube;
         a pair of assembly plates, each one of the pair of assembly plates having an upper pivot hole and a lower pivot hole; and
         an assembly space formed between the pair of the assembly plates and being substantially enclosed;
      a transmission assembly pivotally connected to the upper pivot holes of the pair of assembly plates of the seat tube and comprising
         a pair of front arms located in the assembly space; and
         a pair of rear arms, each one of the pair of rear arms located at a respective one of two sides of the seat tube and extending backwardly;
   a rear vehicle frame comprising
      a pair of seat stays, each one of the pair of seat stays having a front end pivotally connected with a respective one of the pair of rear arms of the transmission assembly;
      a pair of chain stays, each one of the pair of chain stays having a front end pivotally connected with the lower end of the seat tube; and
      a pair of dropouts, each one of the pair of dropouts fixed to a rear end of a respective one of the pair of seat stays and a rear end of a respective one of the pair of chain stays; and
   a damper hidden inside the assembly space of the seat tube in a substantially upright configuration, and having
      a top end pivotally connected with the pair of front arms of the transmission assembly; and
      a bottom end pivotally connected to the lower pivot holes of the pair of assembly plates of the seat tube;
   wherein the seat tube comprises
      an assembly base substantially extending uprightly and having said pair of assembly plates on two sides of the assembly base and a back plate one-piece connected with the pair of assembly plates;
      a post tube substantially extending uprightly, fixed with the assembly base, and having an assembly hole communicating with the assembly space; and
      a cover configured to shield the assembly hole; and
   wherein the assembly base and the post tube are connected by welding a connecting edge of the assembly base and a connecting edge of the post tube.

2. The hidden-type shock absorbing bicycle frame as claimed in claim 1, wherein the seatpost installation hole is formed along an axis of an upper section of the post tube, and the post tube has multiple ribs disposed at spaced intervals and connected with the seatpost installation hole to support the seatpost installation hole.

3. The hidden-type shock absorbing bicycle frame as claimed in claim 2, wherein the seat tube comprises a locking socket connected to a top end of the post tube.

4. The hidden-type shock absorbing bicycle frame as claimed in claim 1, wherein the front end of each one of the pair of chain stays is pivotally connected behind a respective one of the lower pivot holes of the seat tube via a first pivot assembly.

5. The hidden-type shock absorbing bicycle frame as claimed in claim 1, wherein
   the transmission assembly comprises
      an arm base disposed in the assembly space of the seat tube and having
         an axle portion having an axle hole disposed transversely therethrough; and
         the pair of front arms extending from two ends of the axle portion, respectively;
      a pair of side arm components located on two sides of the arm base, respectively, each one of the pair of side arm components having
         an engaging head engaged with a respective one of the two ends of the axle portion through a respective one of the upper pivot holes of the seat tube so as to make the side arm component incapable of rotating with respect to the arm base, and having an axle hole disposed through the side arm component; and
      an axle extending through the axle holes of the pair of side arm components and the axle hole of the arm base so as to make the transmission assembly pivotally connected to the upper pivot holes of the seat tube in a swingable configuration;
   the top end of the damper is pivotally connected with the pair of front arms via a second pivot assembly.

6. The hidden-type shock absorbing bicycle frame as claimed in claim 2, wherein
the transmission assembly comprises
an arm base disposed in the assembly space of the seat tube and having
an axle portion having an axle hole disposed transversely therethrough; and
the pair of front arms extending from two ends of the axle portion, respectively;
a pair of side arm components located on two sides of the arm base, respectively, each one of the pair of side arm components having
an engaging head engaged with a respective one of the two ends of the axle portion through a respective one of the upper pivot holes of the seat tube so as to make the side arm component incapable of rotating with respect to the arm base, and having an axle hole disposed through the side arm component; and
an axle extending through the axle holes of the pair of side arm components and the axle hole of the arm base so as to make the transmission assembly pivotally connected to the upper pivot holes of the seat tube in a swingable configuration;
the top end of the damper is pivotally connected with the pair of front arms via a second pivot assembly.

7. The hidden-type shock absorbing bicycle frame as claimed in claim 3, wherein
the transmission assembly comprises
an arm base disposed in the assembly space of the seat tube and having
an axle portion having an axle hole disposed transversely therethrough; and
the pair of front arms extending from two ends of the axle portion, respectively;
a pair of side arm components located on two sides of the arm base, respectively, each one of the pair of side arm components having
an engaging head engaged with a respective one of the two ends of the axle portion through a respective one of the upper pivot holes of the seat tube so as to make the side arm component incapable of rotating with respect to the arm base, and having an axle hole disposed through the side arm component; and
an axle extending through the axle holes of the pair of side arm components and the axle hole of the arm base so as to make the transmission assembly pivotally connected to the upper pivot holes of the seat tube in a swingable configuration;
the top end of the damper is pivotally connected with the pair of front arms via a second pivot assembly.

8. The hidden-type shock absorbing bicycle frame as claimed in claim 4, wherein
the transmission assembly comprises
an arm base disposed in the assembly space of the seat tube and having
an axle portion having an axle hole disposed transversely therethrough; and
the pair of front arms extending from two ends of the axle portion, respectively;
a pair of side arm components located on two sides of the arm base, respectively, each one of the pair of side arm components having
an engaging head engaged with a respective one of the two ends of the axle portion through a respective one of the upper pivot holes of the seat tube so as to make the side arm component incapable of rotating with respect to the arm base, and having an axle hole disposed through the side arm component; and
an axle extending through the axle holes of the pair of side arm components and the axle hole of the arm base so as to make the transmission assembly pivotally connected to the upper pivot holes of the seat tube in a swingable configuration;
the top end of the damper is pivotally connected with the pair of front arms via a second pivot assembly.

9. The hidden-type shock absorbing bicycle frame as claimed in claim 5, wherein a bearing is disposed between the engaging head of each one of the pair of side arm components and the corresponding upper pivot hole.

10. The hidden-type shock absorbing bicycle frame as claimed in claim 9, wherein a flexible spacer is clamped between the axle portion of the arm base and the bearing.

11. The hidden-type shock absorbing bicycle frame as claimed in claim 5, wherein the arm base has a pair of engaging grooves recessed from the two ends of the axle portion and being non-circular, and the engaging head of each one of the pair of side arm components has an engaging block matching and engaged with a respective one of the pair of engaging grooves.

12. The hidden-type shock absorbing bicycle frame as claimed in claim 11, wherein said engaging groove is semicircular or polygonal.

\* \* \* \* \*